(12) United States Patent
Wallrafen

(10) Patent No.: US 6,202,811 B1
(45) Date of Patent: Mar. 20, 2001

(54) CLUTCH

(75) Inventor: Werner Wallrafen, Hofheim (DE)

(73) Assignee: Mannesmann VDO AG, Frankfort/Main (DE)

( * ) Notice: Subject to any disclaimer, the term of this patent is extended or adjusted under 35 U.S.C. 154(b) by 0 days.

(21) Appl. No.: 09/402,774
(22) PCT Filed: Mar. 25, 1998
(86) PCT No.: PCT/EP98/01741
  § 371 Date: Dec. 23, 1999
  § 102(e) Date: Dec. 23, 1999
(87) PCT Pub. No.: WO98/45613
  PCT Pub. Date: Oct. 15, 1998

(30) Foreign Application Priority Data

Apr. 10, 1997 (DE) .............................................. 197 14 775

(51) Int. Cl.⁷ .................................................. F16D 13/58
(52) U.S. Cl. .................................. 192/30 W; 192/70.27; 340/454
(58) Field of Search ............................. 192/30 W, 70.27; 340/454; 188/1.11 L

(56) References Cited

U.S. PATENT DOCUMENTS

| 1,397,902 | * | 11/1921 | Price ............................... 192/70.27 X |
| 1,765,304 | * | 6/1930 | Wemp ............................ 192/70.27 X |
| 4,550,818 | * | 11/1985 | Gale .................................. 192/30 W |

FOREIGN PATENT DOCUMENTS 55-126127 * 9/1980 (JP) ................................... 192/30 W

* cited by examiner

*Primary Examiner*—Richard M. Lorence
(74) *Attorney, Agent, or Firm*—Mayer, Brown & Platt

(57) ABSTRACT

A clutch for a motor vehicle has a sensor device (7) for detecting the limit of wear of friction linings (6), with an electric switch (11) having an electric conductor (13). The electric conductor (13) is severed by a rotatably mounted switching part (14) when the limit of wear is reached. Before the limit of wear has been reached, the switching part (14) is biased by a blocking part (15) into a position remote from the electric conductor (13). It is possible thereby to determine the limit of wear with particular exactitude.

14 Claims, 2 Drawing Sheets

CLUTCH

This application is made pursuant to 35 U.S.C. § 371 of international application number PCT/EP98/01741, filed Mar. 25, 1998, with a priority date of Apr. 10, 1997.

FIELD OF THE INVENTION

The invention relates to a clutch having at least one friction lining, provided between a disk arranged in a rotationally secure fashion on a first shaft and a pressure plate arranged in a rotationally secure and axially displaceable fashion on a second shaft, for producing a grip between the disk and the pressure plate, having an actuating mechanism for moving the pressure plate against the force of a spring element which biases the pressure plate in the direction of the disk, and having a sensor device for detecting the limit of wear of the friction lining.

BACKGROUND OF THE INVENTION

Clutches are frequently arranged in present-day motor vehicles between an internal-combustion engine and a transmission, and are therefore known. The disk is in this case frequently constructed as a flywheel disk and fastened on a drive shaft of the internal-combustion engine. When the limit of wear is reached, the friction lining has a minimum thickness and must be exchanged.

A brake known in practice has an electric conductor, through which a signal current flows, in a friction lining in the region of the limit of wear. When the limit of wear of the friction lining is reached, the electric conductor is severed and the signal current is interrupted. The interruption of the signal current thus signals that the minimum thickness of the friction lining has been reached.

This brake has the advantage that it supplies an unambiguous electric switching signal when a minimum thickness of the friction lining has been reached.

By contrast with analog signals, digital signals are largely independent of temperature and can easily be assigned to a specific state. In this case, the electric signals generated are also independent of an adjusting device arranged on the actuating device (pedal and lever device). Furthermore, it is possible for a warning lamp, for example, to be activated on a dashboard of the motor vehicle with little electronic outlay.

However, it is disadvantageous in the known brake that the way in which contact is made with the electric conductor in the rotating friction lining, for example via sliding contacts or induction coils, is very complicated and vulnerable. Furthermore, the electric conductors have manufacturing tolerances, and frequently cannot be arranged reliably in a prescribed position in the friction lining.

Thus, there is a need for a clutch of the type mentioned at the beginning such that it is possible to determine in a particularly accurate fashion with a low outlay and without the risk of erroneous measurements that the minimum thickness of the friction lining has been reached. Other needs will become apparent upon a further reading of the following detailed description taken in conjunction with the drawings.

SUMMARY OF THE INVENTION

According to the invention, this problem is solved by virtue of the fact that the sensor device has a moving switching part, arranged on the second shaft, for actuating a fixed electric switch, and that a blocking part connected to the pressure plate is provided for holding the switching part in a position remote from the electric switch before the limit of wear of the friction lining has been reached.

By virtue of this configuration, the switch is arranged on a fixed component of the clutch—for example the clutch bell—and can be hard-wired for contactive purposes. The blocking part connected to the pressure pivotably mounted with one end and is held in a radially inner position by the blocking part with the other end. When the limit of wear of the friction lining is reached, the movement of the switching part is released by the blocking part. The switching part then moves outward owing to the centrifugal force and actuates the switch.

The clutch according to the invention has particularly small dimensions when the switching part is arranged displaceably in a shaft.

When the limit of wear of the friction lining is reached, the switching part could be moved by the centrifugal force. However, it is disadvantageous in this case that vibrations may cause rattling of the switching part on the blocking part. This could damage the switching part and the blocking part. Rattling of the switching part on the blocking part can be avoided simply in accordance with another advantageous development of the invention when the switching part is biased by a spring element against the blocking part. As a result of this configuration, the switching part always bears reliably on the blocking part and is moved independently of the centrifugal force against the switch.

In accordance with another advantageous development of the invention, the assembly of the electric switch becomes particularly simple when the electric switch is fastened on a clutch bell forming a housing of the clutch.

An erroneous measurement due to soiling of the electric switch can be avoided in a simple way in accordance with another advantageous development of the invention when the electric switch has a reed contact or a sensor sensitive to magnetic fields, and the switching part plate moves along with the pressure plate in the case of wear of the friction lining, while the switching part remains fixed. The switching part is held by the blocking part before the limit of wear of the friction lining has been reached. When the limit of wear of the friction lining is reached, the switching part is abruptly released and actuates the switch during rotation of the pressure plate. The blocking part and the switching part are components which can be produced simply and with small tolerances. As a result, the minimum thickness of the friction lining can be determined accurately to 0.1 mm, for example. The risk of erroneous measurements is kept particularly low by the simple design of the sensor device.

The clutch according to the invention is of a structurally particularly simple configuration when the switching part is fastened on a clutch cover connected in a rotationally secure fashion to the second shaft. Such clutch covers are mostly provided for fastening the spring element and the actuating mechanism, and are in any case connected to the second shaft in a fashion which cannot be displaced axially and is rotationally secure.

As a rule, the clutch cover is connected to the pressure plate via drivers constructed as bolts. The drivers are mostly pressed in the pressure plate and penetrate a bore in the clutch cover. In this case, in accordance with another advantageous development of the invention the blocking part is of particularly cost-effective configuration when it is produced in one piece with a driver, fastened in the pressure plate, for the clutch cover.

In accordance with another advantageous development of the invention, the switching part is held reliably in a position remote from the switch above the limit of wear of the friction lining when the switching part is has a magnet for actuating the reed contact or sensor sensitive to magnetic fields.

In accordance with another advantageous development of the invention, the electric switch can be produced in a particularly cost-effective fashion when it has an electric conductor which can be severed by the switching part. Owing to this configuration, the electric switch furthermore requires no complicated electronic evaluation system for detecting a value determined by a reed contact or sensor sensitive to magnetic fields, nor any electronic memory for storing the value.

In accordance with another advantageous development of the invention, it is possible easily to distinguish severing of the electric conductor from a loose contact, short circuit or cable breakage when the electric conductor is connected in series with an electric resistor.

Fragments occurring when the electric conductor is severed could pass into the actuating mechanism or between the pressure plate and the drive disk and impair a reliable grip or actuation of the pressure plate. In accordance with another advantageous development of the invention, fragments of the electric conductor can easily be avoided when the electric conductor has a single rupture joint.

In accordance with another advantageous development of the invention, the electric conductor is reliably severed when the switching part is of sharp-edged configuration at its end facing the electric conductor.

Blocking of the movement of the blocking part by the switching part leads to a permanent grip between the pressure plate and the disk, and must therefore be avoided reliably. In accordance with another advantageous development of the invention, when the limit of wear of the friction lining is reached the switching part is reliably released when it is configured to run to a tip in longitudinal section at its end adjoining the blocking part. This clearly reduces the risk of blocking the blocking part.

In accordance with another advantageous development of the invention, blocking of the movement of the blocking pin can be avoided reliably when the switching part has a rupture joint.

These and other features and advantages of the invention will be apparent upon consideration of the following detailed description of the preferred embodiment of the invention, taken in conjunction with the appended drawings.

DETAILED DESCRIPTION OF THE PREFERRED EMBODIMENT

Figure 1:
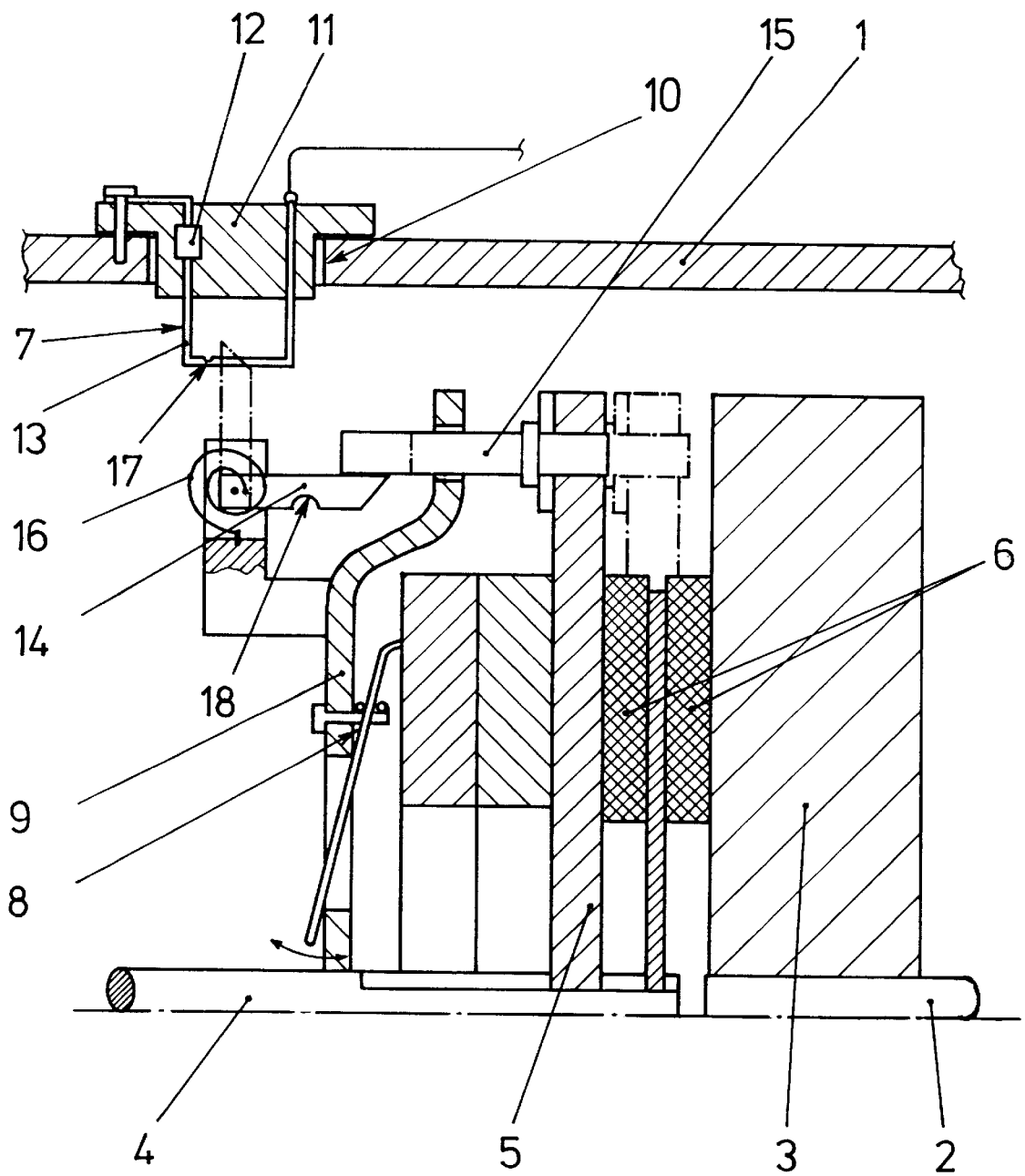
FIG. 1 shows a diagrammatic representation of a clutch according to the invention, in a longitudinal section.

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment described and illustrated.

FIG. 1 shows, in a longitudinal section, a diagrammatic representation of half of a clutch according to the invention, which has a clutch bell 1 forming a housing. The clutch has a flywheel disk 3, which is arranged on a drive shaft 2 in a fashion which is rotationally secure and cannot be displaced axially, and a pressure plate 5, which is arranged in a fashion which is rotationally secure and axially displaceable on an output shaft 4 constructed as a splined shaft. Friction linings 6 for producing a grip between the pressure plate 5 and the flywheel disk 3 are arranged between the pressure plate 5 and the flywheel disk 3. For this purpose, the pressure plate 5 is biased by means of spring elements (not represented) against the flywheel disk 3. An actuating mechanism 8 is provided on the side of the pressure plate 5 averted from the flywheel disk 3 for the purpose of removing the pressure plate 5 from the flywheel disk 3. The actuating mechanism 8 is arranged in a clutch cover 9 permanently connected to the output shaft 4. In the case of wear of the friction linings 6, the pressure plate 5 moves in the direction of the flywheel disk 3 until a limit of wear of the friction linings 6 is reached. This limit of wear defines the minimum thickness of the friction linings 6 at which the clutch operates reliably. This position is illustrated in the drawing by dashed and dotted lines.

The clutch has a sensor device 7 with an electric switch 11 for generating an electric signal when the limit of wear of the friction linings 6 is reached. The switch 11 is fastened in an opening 10 in the clutch bell 1, and has an electric sensor conductor 13 connected in series with an electric resistor 12. A switching part 14 is mounted rotatably on the clutch cover 9. The switching part 14 is held in a radially inner position by a blocking part 15 pressed into the pressure plate 5. Furthermore, the switching part 14 is biased by a spiral spring element 16 against the blocking part 15.

In this case, the blocking part 15 releases the switching part 14 when the limit of wear is reached, with the result that the switching part 14 is turned around and passes into the region of the electric conductor 13 of the switch 11. The electric conductor 13 is subsequently severed during rotation of the clutch. The electric conductor 13 has a rupture joint 17 for its definite separation. In addition, the switching part 14 is of sharp-edged configuration at its free end.

The resistor 12 connected in series with the electric conductor 13 is conductively connected to the clutch bell 1. The other end of the electric conductor 13 has a connection to an evaluation unit (not represented) which, for example, activates a warning lamp on a dashboard. This warning lamp thereby signals that the limit of wear of the friction linings 6 has been reached. The friction linings 6 must subsequently be exchanged with the destroyed switch 11. In order to avoid blocking of the blocking part 15, and thus movement of the pressure plate 5, the switching part 14 is configured to run to a tip at its end adjoining the blocking part 15, and has a rupture joint 18.

Figure 2:
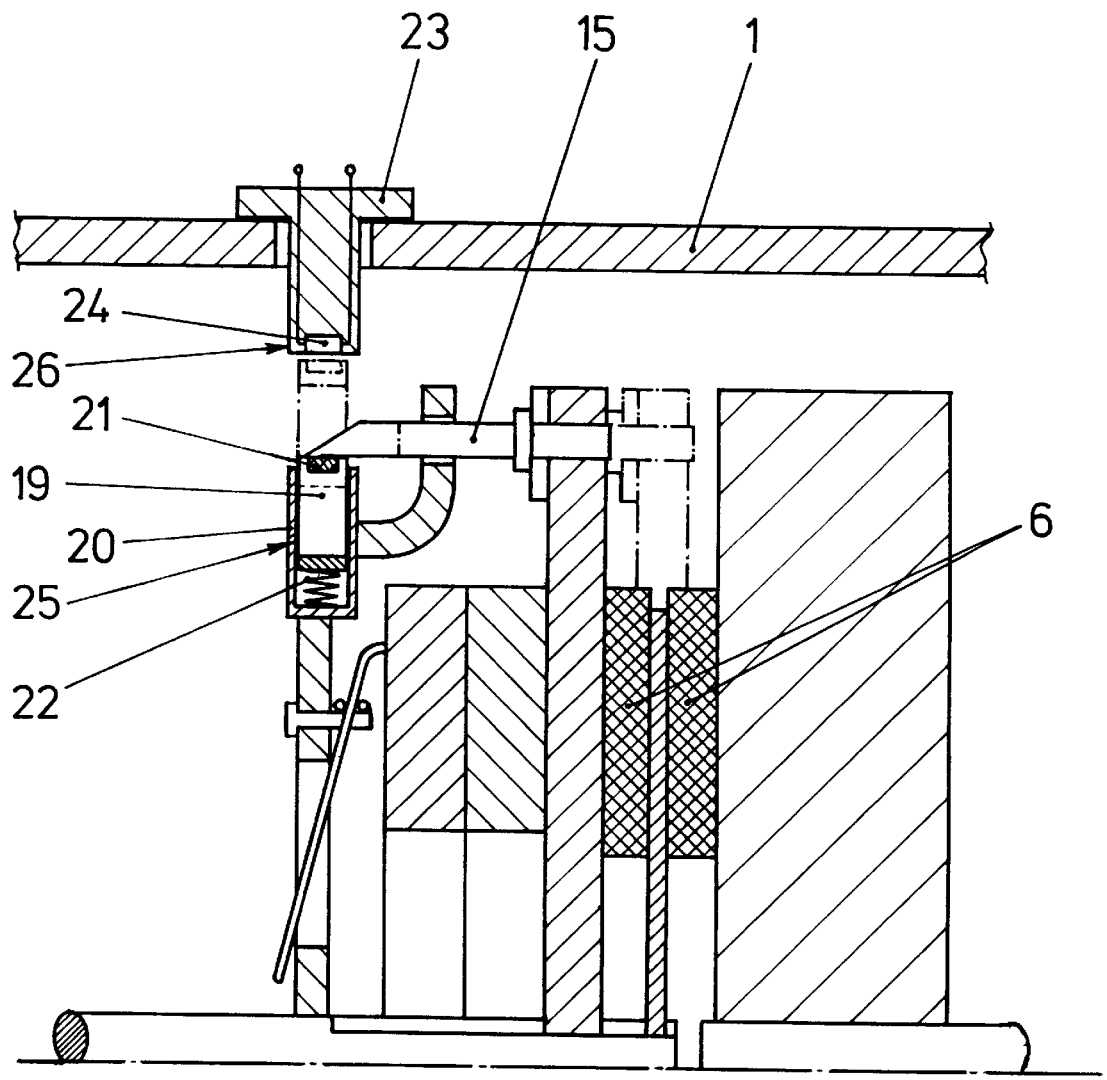
FIG. 2 shows a diagrammatic representation of a further embodiment of the invention.

FIG. 2 shows a further embodiment of the clutch according to the invention with a sensor device 26. In this case, a switching part 19 is arranged in an axially displaceable fashion in a shaft 20. On its end adjoining the blocking part 15, the switching part 19 has a magnet 21, and is biased by a helical spring element 22 against the blocking part 15. An electric switch 23 with a reed contact 24 is arranged in the clutch bell 1. When the limit of wear of the friction linings 6 has been reached, the switching part 19 is released by the blocking part 15 and passes with the magnet 21 into a position close to the reed contact 24. This position is illustrated in the drawing by dashed and dotted lines. As a result, the reed contact 24 switches and signals with each revolution that the limit of wear of the friction linings 6 has been reached. The switching part 19 has a cutout 25 at its center. This permits movement of the blocking part 15 even after the limit of wear of the friction linings 6 has been reached.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A clutch having at least one friction lining, provided between a disk arranged in a rotationally secure fashion on a first shaft and a pressure plate arranged in a rotationally secure and axially displaceable fashion on a second shaft, for producing a grip between the disk and the pressure plate, having an actuating mechanism for moving the pressure plate against the force of a spring element which biases the pressure plate in the direction of the disk, and having a sensor device for detecting the limit of wear of the friction lining, wherein the sensor device has a moving switching part, arranged on the second shaft, for actuating a fixed electric switch, and wherein a blocking part connected to the pressure plate is provided for holding the switching part in a position remote from the electric switch before the limit of wear of the friction lining has been reached.

2. The clutch as claimed in claim 1, wherein the switching part is fastened on a clutch cover connected in a rotationally secure fashion to the second shaft.

3. The clutch as claimed in claim 1, wherein the blocking part is produced in one piece with a driver, fastened in the pressure plate, for a clutch cover.

4. The clutch as claimed in claim 1, wherein the switching part is pivotably mounted with one end and is held in a radially inner position by the blocking part with the other end.

5. The clutch as claimed in claim 1, wherein the switching part is arranged displaceably in a shaft.

6. The clutch as claimed in claim 1, wherein the switching part is biased by a spring element against the blocking part.

7. The clutch as claimed in claim 1, wherein the electric switch is fastened on a clutch bell forming a housing of the clutch.

8. The clutch as claimed in claim 1, wherein the electric switch has a sensor sensitive to magnetic fields, and the switching part has a magnet for actuating the sensor sensitive to magnetic fields.

9. The clutch as claimed in claim 1, wherein the electric switch has an electric conductor which can be severed by the switching part.

10. The clutch as claimed in claim 9, wherein the electric conductor is connected in series with an electric resistor.

11. The clutch as claimed in claim 9, wherein the electric conductor has a single rupture joint.

12. The clutch as claimed claim 1, wherein the switching part is of sharp-edged configuration at its end facing the electric conductor.

13. The clutch as claimed in claim 1, wherein the switching part is configured to run to a tip in longitudinal section at its end adjoining the blocking part.

14. The clutch as claimed in claim 1, wherein the switching part has a rupture joint.

* * * * *